(12) United States Patent
Jiao (10) Patent No.: US 9,247,596 B2
(45) Date of Patent: Jan. 26, 2016

(54) DRIVING CIRCUIT FOR DRIVING LIGHT-EMITTING CIRCUIT, AND LIGHT-EMITTING DEVICE HAVING THE SAME

(71) Applicants: BOE TECHNOLOGY GROUP CO., LTD., Beijing (CN); BEIJING BOE DISPLAY TECHNOLOGY CO., LTD., Beijing (CN)

(72) Inventor: Weijun Jiao, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/429,949

(22) PCT Filed: Sep. 12, 2013

(86) PCT No.: PCT/CN2013/083399
§ 371 (c)(1),
(2) Date: Mar. 20, 2015

(87) PCT Pub. No.: WO2015/000221
PCT Pub. Date: Jan. 8, 2015

(65) Prior Publication Data
US 2015/0230299 A1    Aug. 13, 2015

(30) Foreign Application Priority Data
Jul. 4, 2013  (CN) .......................... 2013 1 0279706

(51) Int. Cl.
*H05B 33/08*   (2006.01)
*H05B 37/02*   (2006.01)

(52) U.S. Cl.
CPC ............ *H05B 33/0815* (2013.01); *H05B 37/02* (2013.01)

(58) Field of Classification Search
None
See application file for complete search history.

(56) References Cited

U.S. PATENT DOCUMENTS

| 2011/0058299 A1 | 3/2011 | Simi |
| 2013/0147350 A1* | 6/2013 | Yang ............................ 315/52 |

FOREIGN PATENT DOCUMENTS

| CN | 1694597 A | 11/2005 |
| CN | 101646290 A | 2/2010 |

(Continued)

OTHER PUBLICATIONS

International Search Report and Written Opinion mailed Sep. 12, 2013 regarding PCT/CN2013/083399.

(Continued)

*Primary Examiner* — Douglas W Owens
*Assistant Examiner* — Dedei K Hammond
(74) *Attorney, Agent, or Firm* — Harness, Dickey & Pierce, P.L.C.

(57) ABSTRACT

A driving circuit is used for driving a light-emitting circuit including a plurality of light-emitting elements connected in series. The driving circuit includes a first silicon controlled rectifier, a first current-limiting resistor, a first resistor, a controllable switch and a control circuit. One end of the first silicon controlled rectifier is grounded, and another end thereof is connected to a driving terminal for providing a driving voltage via the first current-limiting resistor. One end of the controllable switch is connected to the light-emitting circuit, another end thereof is grounded via the first resistor, and a control end thereof is connected to a first node between the silicon controlled rectifier and the first current-limiting resistor. The control circuit is configured to perform a control operation when a voltage applied to a second node between the controllable switch and the light-emitting circuit exceeds a predetermined voltage threshold.

13 Claims, 5 Drawing Sheets

(56) References Cited

FOREIGN PATENT DOCUMENTS

| CN | 101702850 | A | 5/2010 |
|----|-----------|---|--------|
| CN | 101778513 | A | 7/2010 |
| CN | 201577223 | U | 9/2010 |
| CN | 201995169 | U | 9/2011 |
| CN | 202005046 | U | 10/2011 |

OTHER PUBLICATIONS

Chinese Office Action mailed Sep. 24, 2014 regarding Chinese Application No. 201310279706.1. Translation provided by Dragon Intellectual Property Law Firm.

* cited by examiner

DRIVING CIRCUIT FOR DRIVING LIGHT-EMITTING CIRCUIT, AND LIGHT-EMITTING DEVICE HAVING THE SAME

CROSS-REFERENCE TO RELATED APPLICATION

This application is the U.S. national phase of PCT Application No. PCT/CN2013/083399 filed on Sep. 12, 2013, which claims a priority of the Chinese Patent Application No. 201310279706.1 filed on Jul. 4, 2013, the disclosures of which are incorporated in their entirety by reference herein.

TECHNICAL FIELD

The present disclosure relates to the driving of an LED circuit, in particular to a driving circuit and a light-emitting device.

BACKGROUND

Light-emitting diode (LED) has been widely used in industry and our daily lives due to its features such as a small volume and high efficiency.

Figure 1:
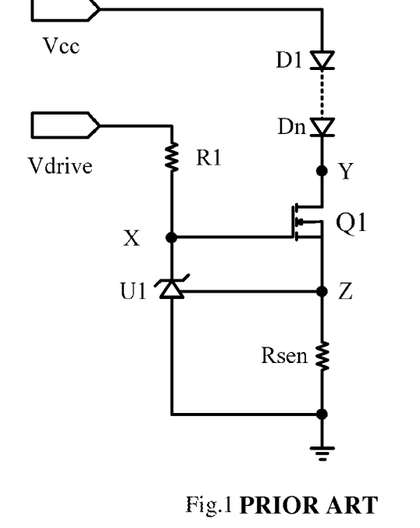
FIG. 1 is a circuit diagram of an existing LED light-emitting device.

Referring to FIG. 1, which shows a common LED light-emitting device, the LED light-emitting device includes a light-emitting circuit, a controllable switch Q1, a resistor Rsen, a silicon controlled rectifier U1 and a first current-limiting resistor R1. The light-emitting circuit includes a plurality of LEDs D1, ..., Dn connected in series, wherein n is an integer greater than 1. One end of the silicon controlled rectifier U1 is grounded, and the other end thereof is connected, via the first current-limiting resistor R1, to a driving terminal Vdrive for providing a driving voltage. A source electrode of the controllable switch Q1 is connected to the light-emitting circuit, a drain electrode thereof is grounded via the resistor Rsen, and a control end (a gate electrode) thereof is connected to a first node X between the silicon controlled rectifier U1 and the first current-limiting resistor R1.

However, when there is a short circuit for LEDs in the LED light-emitting device, the driving circuit is not protected in a sufficient manner. The following description is provided in conjunction with an operation procedure of the LED light-emitting device.

As shown in FIG. 1, the driving voltage Vdrive provides an on-state voltage so as to turn on Q1, thereby to allow a current to flow through D1-Dn and Rsen. When the current flows through Rsen, a voltage drop occurs, and when a voltage across Rsen is greater than a threshold (e.g., 2.5V), the silicon controlled rectifier U1 is turned on so as to pull down a gate voltage of Q1, thereby to turn off Q1, i.e., to cut off the current flowing through the LED. After Q1 is turned off, the voltage across Rsen is dropped down to 0, and at this time the silicon controlled rectifier U1 is turned off again, so that Q1 is turned on again due to the driving voltage Vdrive. The above procedure is repeated, so as to maintain the voltage across Rsen at 2.5V.

If a voltage drop for the LED during the normal operation is V, a voltage drop for Q1 under normal operation is Vcc−nV−2.5. However, when m LEDs among D1-Dn are short-circuited (m is a positive integer less than or equal to n), the voltage drop for Q1 is changed to Vcc−(n−m)V−2.5, i.e., mV greater than the voltage drop for the LED when no short circuit occurs. As a result, the power consumption of Q1 will increase or Q1 will be damaged due to its insufficient voltage-withstanding performance, and thereby a service life of the entire circuit will be adversely affected.

The above description is given by taking the LED light-emitting circuit as an example. It should be appreciated that, the same problem also occurs for similar circuits consisting of any other light-emitting elements, which is not repeated herein.

SUMMARY

An object of the present disclosure is to provide a driving circuit and a light-emitting device, so as to protect the driving circuit.

In one aspect, the present disclosure provides in one embodiment a driving circuit for driving a light-emitting circuit including a plurality of light-emitting elements connected in series. The driving circuit includes a first silicon controlled rectifier, a first current-limiting resistor, a first resistor, a controllable switch and a control circuit. One end of the first silicon controlled rectifier is grounded, and the other end of the first silicon controlled rectifier is connected to a driving terminal for providing a driving voltage via the first current-limiting resistor. One end of the controllable switch is connected to the light-emitting circuit, the other end the controllable switch is grounded via the first resistor, and a control end of the controllable switch is connected to a first node between the silicon controlled rectifier and the first current-limiting resistor. The control circuit is configured to perform a control operation when a voltage applied to a second node between the controllable switch and the light-emitting circuit exceeds a predetermined voltage threshold, so as to reduce a current flowing through the light-emitting circuit.

Alternatively, the light-emitting element is an LED.

Alternatively, the control circuit includes a resistance-variable circuit controlled by the second node, a second resistor, a second current-limiting resistor and a second silicon controlled rectifier. One end of the resistance-variable circuit is connected to the driving terminal via the second current-limiting resistor, and the other end of the resistance-variable circuit is connected to a fifth node via the second resistor. A resistance of the resistance-variable circuit decreases along with an increase in the voltage applied to the second node. The fifth node is a node between the first resistor and the controllable switch. One end of the second silicon controlled rectifier is connected to the driving terminal via the second current-limiting resistor, another end of the second silicon controlled rectifier is connected to the fifth node, and a control end of the second silicon controlled rectifier is connected to a third node between the second current-limiting resistor and the resistance-variable circuit. A control end of the first silicon controlled rectifier is connected to a fourth node between the resistance-variable circuit and the second resistor.

Alternatively, the resistance-variable circuit includes a third resistor, a fourth resistor and a transistor. The fourth resistor and the transistor are connected in series and then connected to the third resistor in parallel, so as to form the resistance-variable circuit. A gate electrode of the transistor is connected to the second node.

Alternatively, the resistance-variable circuit includes a third resistor, a fourth resistor, a transistor, a fifth resistor and a sixth resistor. The fourth resistor and the transistor are connected in series and then connected to the third resistor in parallel, so as to form a parallel circuit. A gate electrode of the transistor is connected to the second node via the fifth resistor, and grounded via the sixth resistor.

In another aspect, the present disclosure provides in another embodiment a light-emitting device which includes a light-emitting circuit including a plurality of LEDs connected in series, and the above-mentioned driving circuit.

The present disclosure at least has the following advantageous effects. In the related art, when the voltage applied to the node between the controllable switch Q1 and the light-emitting circuit exceeds a predetermined voltage threshold, a voltage drop for the controllable switch will increase. In the case of a current being unchanged, such an increase in the voltage drop will result in an increase in the power consumption of the controllable switch, and even the controllable switch will be damaged when its voltage-withstanding performance is insufficient. However, according to the embodiments of the present disclosure, when it is detected that the voltage applied to the second node Y exceeds a predetermined voltage threshold, the control circuit performs a control operation, so as to reduce the current flowing through the light-emitting circuit. As a result, it is able to at least prevent the power consumption of the controllable switch Q1 from being increased too much, thereby to protect the driving circuit.

DETAILED DESCRIPTION

According to a driving circuit and a light-emitting device in the embodiments of the present disclosure, when there is a short circuit for LEDs, a control operation is performed by a control circuit, so as to reduce a current flowing through a light-emitting circuit, thereby to protect the driving circuit.

In order to facilitate the understanding of the embodiments of the present disclosure, a silicon controlled rectifier will be described briefly hereinafter.

The silicon controlled rectifier, also called as thyristor, is a semiconductor element having three PN junctions, and it is commonly used due to its features such as a small volume, a simple structure and powerful functions. Three electrodes, i.e., an anode, a control electrode and a cathode K, are led out from the three PN junctions of the silicon controlled rectifier, respectively, and as compared with a diode, the silicon controlled rectifier further includes the control electrode.

The silicon controlled rectifier used in the embodiments of the present disclosure has the following features. The silicon controlled rectifier is turned on when a voltage applied to its control electrode is greater than a threshold (i.e., a reference voltage of the silicon controlled rectifier), and it is turned off when the voltage applied to its control electrode is less than the threshold.

The present disclosure provides in one embodiment a driving circuit for driving a light-emitting circuit including a plurality of light-emitting elements (e.g., LED D1, . . . , Dn in FIG. 2, and the light-emitting elements of any other types may also be applicable) connected in series. The driving circuit includes a first silicon controlled rectifier U1, a first current-limiting resistor R1, a resistor Rsen (a current-detecting resistor), a controllable switch Q1 and a control circuit. One end of the first silicon controlled rectifier U1 is grounded, and another end thereof is connected to a driving terminal Vdrive for providing a driving voltage via the first current-limiting resistor R1. One end of the controllable switch Q1 is connected to the light-emitting circuit, another end thereof is grounded via the resistor Rsen, and a control end thereof is connected to a first node X between the silicon controlled rectifier U1 and the first current-limiting resistor R1. The control circuit is configured to perform a control operation when a voltage applied to a second node Y between the controllable switch Q1 and the light-emitting circuit exceeds a predetermined voltage threshold, so as to reduce a current flowing through the light-emitting circuit.

Figure 2:
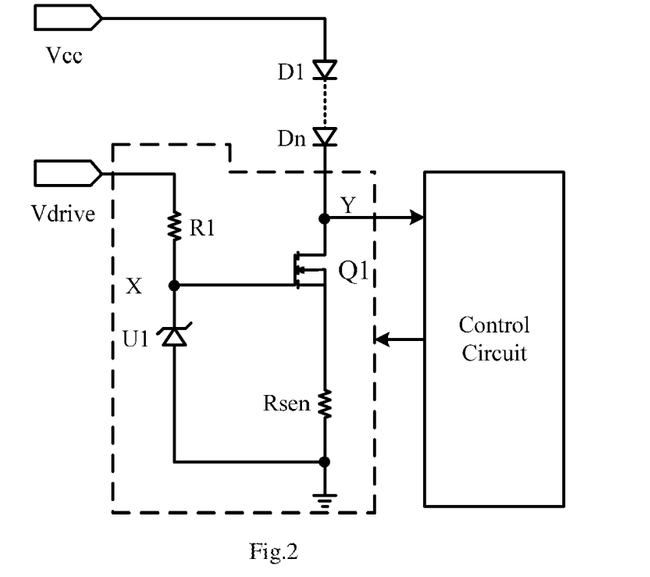
FIG. 2 is a circuit diagram of a driving circuit according to an embodiment of the present disclosure.

When the voltage applied to the second node Y between the controllable switch Q1 and the light-emitting circuit exceeds the predetermined voltage threshold (at this time, some LEDs in the light-emitting circuit are short-circuited, or a voltage Vcc increases), a voltage drop for an existing controllable switch will increase. In the case of a current being unchanged, such an increase in the voltage drop will result in an increase in the power consumption of the controllable switch, and even the controllable switch will be damaged when its voltage-withstanding performance is insufficient. However, according to the embodiment of the present disclosure, when it is detected that the voltage applied to the second node Y exceeds the predetermined voltage threshold, the control circuit performs the control operation, so as to reduce the current flowing through the light-emitting circuit. As a result, it is able to at least prevent the power consumption of the controllable switch Q1 from being increased too much, thereby to protect the driving circuit.

The control circuit may be implemented in various ways, and one of them will be described hereinafter.

Figure 3:
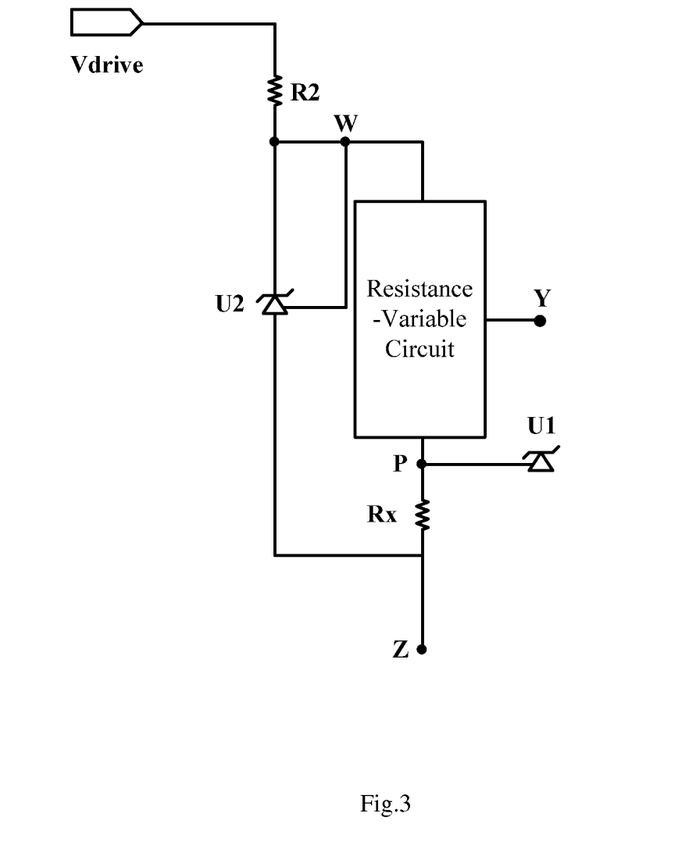
FIG. 3 is a circuit diagram of a control circuit according to an embodiment of the present disclosure.

In a specific embodiment of the present disclosure, as shown in FIG. 3, the control circuit includes a resistance-variable circuit controlled by the second node Y, a second resistor Rx, a second current-limiting resistor R2 and a second silicon controlled rectifier U2. One end of the resistance-variable circuit is connected to the driving terminal via the second current-limiting resistor R2, and the other end thereof is connected to a fifth node Z via the second resistor Rx. A resistance of the resistance-variable circuit decreases along with an increase in the voltage applied to the second node Y. The fifth node Z is a node between the resistor Rsen and the controllable switch Q1. One end of the second silicon controlled rectifier U2 is connected to the driving terminal Vdrive via the second current-limiting resistor R2, another end thereof is connected to the fifth node Z, and a control end thereof is connected to a third node W between the second current-limiting resistor R2 and the resistance-variable circuit. A control end of the first silicon controlled rectifier U1 is connected to a fourth node P between the resistance-variable circuit and the second resistor Rx.

Figure 4:
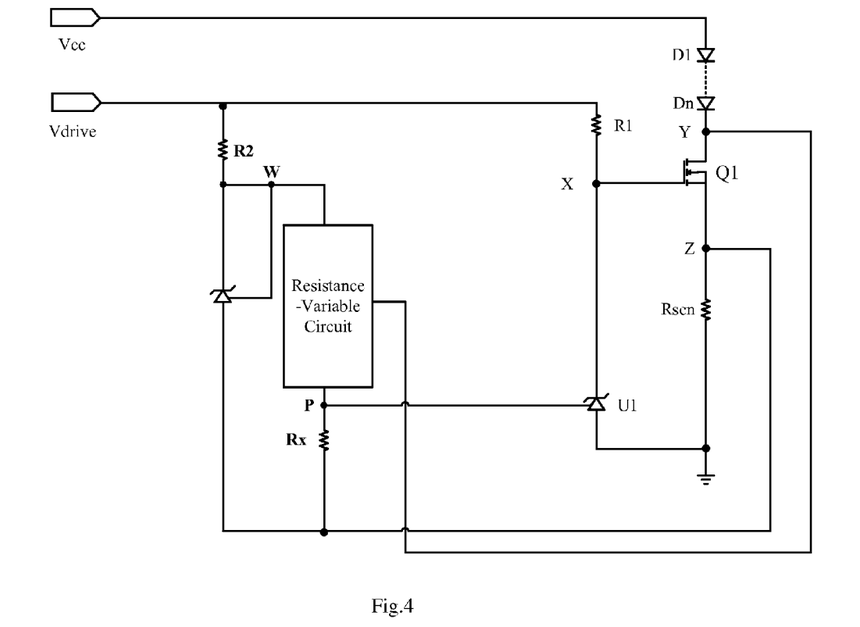
FIG. 4 is circuit diagram of an LED light-emitting circuit with the control circuit in FIG. 3 according to an embodiment of the present disclosure.

FIG. 4 shows an entire circuit structure using the above-mentioned control circuit. The principle of reducing the current flowing through the light-emitting circuit when some LEDs in the circuit are short-circuited using the circuit as shown in FIG. 4 will be described hereinafter.

At first, as shown in FIG. 4, when some LEDs in the circuit are short-circuited, the voltage applied to the node Y increases, and such an increase in the voltage applied to the node Y results in a decrease in the resistance of the resistance-variable circuit. Because a constant voltage is applied to a series circuit consisting of the resistance-variable circuit and Rx, the voltage applied to Rx increases.

Rx and Rsen are connected in series and then grounded. Due to the first silicon controlled rectifier U1, a constant voltage is applied to the node P. When the voltage applied to Rx increases, the voltage applied to Rsen decreases.

A decrease in the voltage applied to Rsen results in a decrease in the current flowing through the series circuit consisting of D1, . . . , Dn, Q1 and Rsen, i.e., the current flowing through Q1 decreases. As a result, it is able to cancel out an increase in the power consumption caused by an increase in the voltage applied to Q1.

In a specific embodiment of the present disclosure, the resistance-variable circuit may be implemented in various ways. For example, a variable resistor with its resistance decreasing along with an increase in a voltage may be directly used. Also, the resistance-variable circuit may be implemented in any other ways, and one possible way will be described hereinafter.

Figure 5:
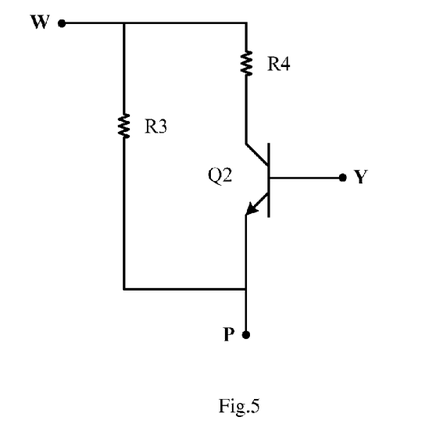
FIGS. 5 and 6 are circuit diagrams of a resistance-variable circuit according to an embodiment of the present disclosure.

As shown in FIG. 5, the resistance-variable circuit includes a third resistor R3, a fourth resistor R4 and a transistor Q2. The fourth resistor R4 and the transistor Q2 are connected in series and then connected to the third resistor R3 in parallel, so as to form the resistance-variable circuit. A gate electrode of the transistor is connected to the second node Y.

The function of the fourth resistor R4 will be described hereinafter in conjunction with FIG. 5. If the resistance-variable circuit includes Q2 but does not include R4 and a large voltage is applied to the node Y, Q2 is turned on and two ends of R3 are short-circuited approximately, so the circuit cannot operate normally. In this regard, R4 is required so as to avoid this case.

An operation procedure of the circuit will be described hereinafter in conjunction with FIG. 5. When the voltage applied to the node Y is greater than an on-state voltage of Q2, Q2 is turned on and operates in an amplification state. Before reaching a saturation state, Q2 is similar to a linear resistor. The larger the voltage applied to the node Y, the smaller an equivalent resistance between a collector and an emitter of Q2. As a result, there may be such a situation where the equivalent resistance between the collector and the emitter of Q2 decreases along with the increase in the voltage applied to the node Y.

When the equivalent resistance between the collector and the emitter of Q2 decreases along with the increase in the voltage applied to the node Y, the resistance of the series circuit consisting of Q2 and R4 decreases, and thereby the resistance of the parallel circuit consisting of the series circuit and R3 decreases too.

In the above embodiment, when a large voltage is applied to the node Y, Q2 may operate at a saturation region, and the equivalent resistance between the collector and the emitter may not vary along with the voltage applied to the node Y. Therefore, in order to ensure a normal operation of the control circuit, the voltage applied to the node Y may be divided, so as to ensure that the voltage applied to Q2 is not greater than the voltage sufficient to enable Q2 to operate at the saturation region.

Figure 6:
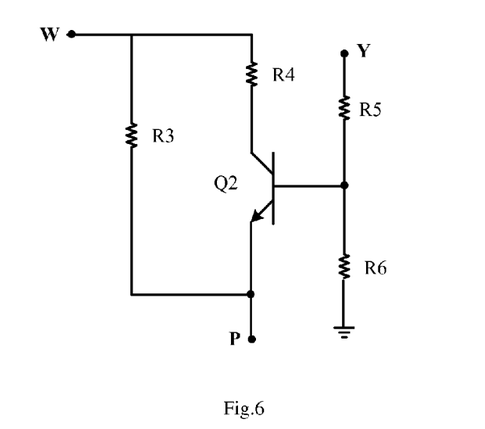

As shown in FIG. 6, the resistance-variable circuit of this kind includes the third resistor R3, the fourth resistor R4, the transistor Q2, a fifth resistor R5 and a sixth resistor R6. The fourth resistor R4 and the transistor Q2 are connected in series and then connected to the third resistor R3 in parallel to form a parallel circuit. The gate electrode of the transistor Q2 is connected to the second node Y via the fifth resistor R5 and grounded via the sixth resistor R6.

Figure 7:
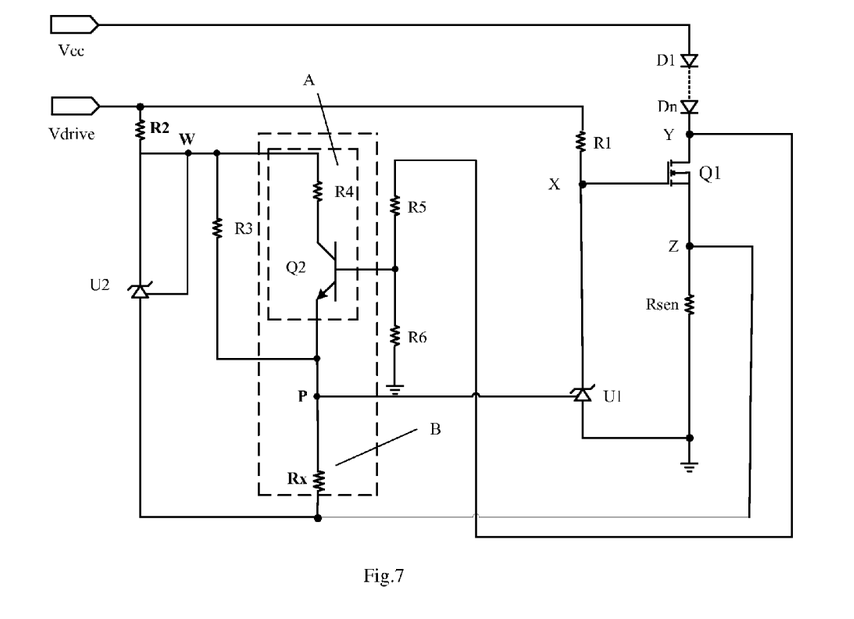
FIG. 7 is a circuit diagram of an LED light-emitting circuit with the resistance-variable circuit in FIG. 6 according to an embodiment of the present disclosure.

Referring to FIG. 7, which is a schematic view showing the specific circuit according to the embodiment of the present disclosure, the operation procedure of the circuit will be described hereinafter.

When D1, . . . , Dn operate normally, the voltage applied to the node Y is divided by R5 and R6 and thus is insufficient to turn on Q2. At this time, the control circuit is in a nonoperating state.

When some LEDs of D1, . . . , Dn are short-circuited, the voltage applied to the node Y increases, and at this time, the voltage applied to the gate electrode of Q2 increases too, so Q2 is turned on.

When more LEDs are short-circuited, the voltage applied to Q1 increases since the voltage applied to Rsen is unchanged,. At the same time, the equivalent resistance between the collector and the emitter of Q2 decreases, so the resistance of the resistance-variable circuit consisting of R3, R4 and Q2 decreases too. Since a constant voltage is applied to the resistance-variable circuit and Rx due to U2, and the resistance of the resistance-variable circuit decreases, a current flowing through the series circuit consisting of the resistance-variable circuit and Rx increases, resulting in an increase in the voltage applied to Rx.

Rx and Rsen are connected in series and then grounded. Due to the first silicon controlled rectifier U1, the voltage applied to the node P is constant, so the voltage applied to Rsen decreases when the voltage applied to Rx increases.

At this time, a current flowing through a series circuit consisting of D1, . . . , Dn, Q1 and Rsen decreases due to a decrease in the voltage applied to Rsen, i.e., the current flowing through Q1 decreases. As a result, it is able to cancel out an increase in the power consumption caused by the increase in the voltage applied to Q1.

The performance of the entire circuit will be described quantitatively hereinafter in conjunction with the above-mentioned circuit. As shown in FIG. 7, R1 and R2 are both current-limiting resistors, and their values may be the same or different.

Referring to FIG. 7, R4 and Q2 are connected in series and then connected to R3 in parallel so as to form a sub-circuit A (dotted box A). The sub-circuit A is connected to the resistor Rx in series so as to form a sub-circuit B (dotted box B) which is connected to U2 in parallel. Assuming that $V_{ref}$ represents a reference voltage of U2 and U1, then $V_{R3}+V_{Rx}=V_{ref}$, and similarly $V_{Rx}+V_{Rsen}=V_{ref}$, where $V_{R3}$, $V_{Rsen}$ and $V_{Rx}$ represent voltages applied to R3, Rsen and Rx, respectively. It can be obtained that $V_{Rsen}=V_{R3}$.

If $V_Y$ (the voltage applied to the node Y) is too low to turn on Q2, then $V_{Rx}=V_{ref}*Rx/(R3+Rx)$, $V_{Rsen}=V_{R3}=V_{ref}*R3/(R3+Rx)$, and $V_{Rsen}=I_{led}*Rsen$, where $I_{led}$ represents a current flowing through the LED. It can be obtained that $I_{led}=V_{R3}/Rsen$, i.e., the current flowing through the LED depends on $V_{R3}$.

If $V_Y$ (the voltage applied to the node Y) exceeds a predetermined value to turn on Q2, Q2 and R4 are connected in series and then connected to R3 in parallel. At this time, $R_Y$, the parallel resistance, is certainly less than R3, i.e., $V_{R3}$ decreases. Because $I_{led}=V_{R3}/Rsen$, a decrease in $V_{R3}$ results in a decrease in $I_{led}$.

The power consumption of Q1 will be analyzed as follows. When $P_{Q1}$ represents the power consumption of Q1, $P_{Q1}=V_Y*I_{led}-Rsen*I_{led}*I_{led}$. It is found that, $P_{Q1}$ is a quadratic function of $I_{led}$. According to the characteristics of this quadratic function, when $I_{led}$ decreases within a certain range, $P_{Q1}$ may decrease too.

Considering an on-state of Q2, because a ground voltage applied to the node P is $V_{ref}$, Q2 is turned on only when its base voltage is greater than a sum of $V_{ref}$ and $V_{be}$ (a voltage between the collector and the emitter). In other words, when $V_Y$ is greater than $V_{ref}V_{be}$, Q2 starts to operate. An operating state of Q2 may be adjusted through R5 and R6.

Figure 8:
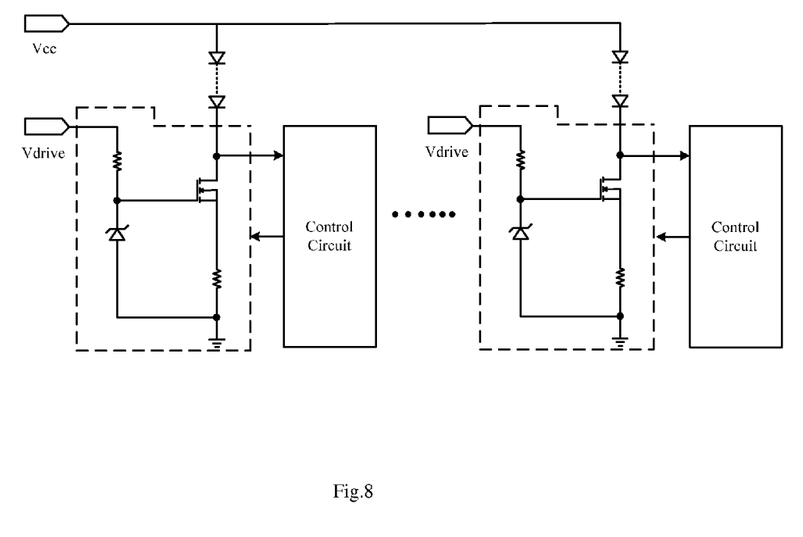
FIG. 8 is a circuit diagram of parallel light-emitting circuits with the control circuits according to an embodiment of the present disclosure.

One light-emitting circuit is taken as an example in the specific embodiment of the present disclosure. It should be appreciated that, the existing light-emitting circuit may consist of a plurality of circuits connected in parallel, and in this case, the control circuit may be provided for each circuit, as shown in FIG. 8. The operating principle of each control circuit is totally the same, and thus will not be repeated herein.

The present disclosure further provides in another embodiment a light-emitting device including the light-emitting circuit with a plurality of LEDs connected in series as well as the above-mentioned driving circuit. The operating procedure of each circuit has been described hereinbefore, and thus will not be repeated herein.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. A driving circuit for driving a light-emitting circuit comprising a plurality of light-emitting elements connected in series, wherein the driving circuit comprises a first silicon controlled rectifier, a first current-limiting resistor, a first resistor, a controllable switch and a control circuit,
   one end of the first silicon controlled rectifier is grounded, and another end of the first silicon controlled rectifier is connected to a driving terminal for providing a driving voltage via the first current-limiting resistor,
   one end of the controllable switch is connected to the light-emitting circuit, another end of the controllable switch is grounded via the first resistor, and a control end of the controllable switch is connected to a first node between the silicon controlled rectifier and the first current-limiting resistor, and
   the control circuit is configured to perform a control operation when a voltage applied to a second node between the controllable switch and the light-emitting circuit exceeds a predetermined voltage threshold, so as to reduce a current flowing through the light-emitting circuit.

2. The driving circuit according to claim 1, wherein the light-emitting element is an LED.

3. The driving circuit according to claim 2, wherein the control circuit comprises a resistance-variable circuit controlled by the second node, a second resistor, a second current-limiting resistor and a second silicon controlled rectifier,
   one end of the resistance-variable circuit is connected to the driving terminal via the second current-limiting resistor, another end of the resistance-variable circuit is connected to a fifth node via the second resistor, a resistance of the resistance-variable circuit decreases along with an increase in the voltage applied to the second node, and the fifth node is a node between the first resistor and the controllable switch,
   one end of the second silicon controlled rectifier is connected to the driving terminal via the second current-limiting resistor, another end of the second silicon controlled rectifier is connected to the fifth node, and a control end of the second silicon controlled rectifier is connected to a third node between the second current-limiting resistor and the resistance-variable circuit, and
   a control end of the first silicon controlled rectifier is connected to a fourth node between the resistance-variable circuit and the second resistor.

4. The driving circuit according to claim 3, wherein the resistance-variable circuit comprises a third resistor, a fourth resistor and a transistor, the fourth resistor and the transistor are connected in series and then connected to the third resistor in parallel, so as to form the resistance-variable circuit, and a gate electrode of the transistor is connected to the second node.

5. The driving circuit according to claim 3, wherein the resistance-variable circuit comprises a third resistor, a fourth resistor, a transistor, a fifth resistor and a sixth resistor, the fourth resistor and the transistor are connected in series and then connected to the third resistor in parallel, so as to form a parallel circuit, and a gate electrode of the transistor is connected to the second node via the fifth resistor and grounded via the sixth resistor.

6. The driving circuit according to claim 1, wherein the control circuit comprises a resistance-variable circuit controlled by the second node, a second resistor, a second current-limiting resistor and a second silicon controlled rectifier,
   one end of the resistance-variable circuit is connected to the driving terminal via the second current-limiting resistor, another end of the resistance-variable circuit is connected to a fifth node via the second resistor, a resistance of the resistance-variable circuit decreases along with an increase in the voltage applied to the second node, and the fifth node is a node between the first resistor and the controllable switch,
   one end of the second silicon controlled rectifier is connected to the driving terminal via the second current-limiting resistor, another end of the second silicon controlled rectifier is connected to the fifth node, and a control end of the second silicon controlled rectifier is connected to a third node between the second current-limiting resistor and the resistance-variable circuit, and
   a control end of the first silicon controlled rectifier is connected to a fourth node between the resistance-variable circuit and the second resistor.

7. The driving circuit according to claim 6, wherein the resistance-variable circuit comprises a third resistor, a fourth resistor and a transistor, the fourth resistor and the transistor are connected in series and then connected to the third resistor in parallel, so as to form the resistance-variable circuit, and a gate electrode of the transistor is connected to the second node.

8. The driving circuit according to claim 6, wherein the resistance-variable circuit comprises a third resistor, a fourth resistor, a transistor, a fifth resistor and a sixth resistor, the fourth resistor and the transistor are connected in series and then connected to the third resistor in parallel, so as to form a parallel circuit, and a gate electrode of the transistor is connected to the second node via the fifth resistor and grounded via the sixth resistor.

9. A light-emitting device, comprising a light-emitting circuit including a plurality of light-emitting elements connected in series, wherein the light-emitting device further comprises a driving circuit for driving the light-emitting circuit, the driving circuit comprises a first silicon controlled rectifier, a first current-limiting resistor, a first resistor, a controllable switch and a control circuit, one end of the first silicon controlled rectifier is grounded, and another end of the first silicon controlled rectifier is connected to a driving terminal for providing a driving voltage via the first current-limiting resistor, one end of the controllable switch is connected to the light-emitting circuit, another end of the controllable switch is grounded via the first resistor, and a control end of the controllable switch is connected to a first node between the silicon controlled rectifier and the first current-limiting resistor, and the control circuit is configured to perform a control operation when a voltage applied to a second node between the controllable switch and the light-emitting circuit exceeds a predetermined voltage threshold, so as to reduce a current flowing through the light-emitting circuit.

10. The light-emitting device according to claim 9, wherein the light-emitting element is an LED.

11. The light-emitting device according to claim 9, wherein the control circuit comprises a resistance-variable circuit controlled by the second node, a second resistor, a second current-limiting resistor and a second silicon controlled rectifier, one end of the resistance-variable circuit is connected to the driving terminal via the second current-limiting resistor, another end of the resistance-variable circuit is connected to a fifth node via the second resistor, a resistance of the resistance-variable circuit decreases along with an increase in the voltage applied to the second node, and the fifth node is a node between the first resistor and the controllable switch, one end of the second silicon controlled rectifier is connected to the driving terminal via the second current-limiting resistor, another end of the second silicon controlled rectifier is connected to the fifth node, and a control end of the second silicon controlled rectifier is connected to a third node between the second current-limiting resistor and the resistance-variable circuit, and a control end of the first silicon controlled rectifier is connected to a fourth node between the resistance-variable circuit and the second resistor.

12. The light-emitting device according to claim 11, wherein the resistance-variable circuit comprises a third resistor, a fourth resistor and a transistor, the fourth resistor and the transistor are connected in series and then connected to the third resistor in parallel, so as to form the resistance-variable circuit, and a gate electrode of the transistor is connected to the second node.

13. The light-emitting device according to claim 11, wherein the resistance-variable circuit comprises a third resistor, a fourth resistor, a transistor, a fifth resistor and a sixth resistor, the fourth resistor and the transistor are connected in series and then connected to the third resistor in parallel, so as to form a parallel circuit, and a gate electrode of the transistor is connected to the second node via the fifth resistor and grounded via the sixth resistor.

* * * * *